United States Patent
Niemi et al.

(10) Patent No.: US 6,609,996 B2
(45) Date of Patent: Aug. 26, 2003

(54) METHOD FOR SEALING OF A COATING ON A ROLL

(75) Inventors: Kari Niemi, Tikkakoski (FI); Bjarne Hellman, Riihimäki (FI); Juha Wahlroos, Polokka (FI); Pentti Lehtonen, Jyväskylä (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 09/928,556

(22) Filed: Aug. 13, 2001

(65) Prior Publication Data

US 2002/0066405 A1 Jun. 6, 2002

Related U.S. Application Data

(63) Continuation of application No. PCT/FI00/00109, filed on Feb. 15, 2000.

(30) Foreign Application Priority Data

Feb. 15, 1999 (FI) .................................................. 990298

(51) Int. Cl.$^7$ ............................ B25F 5/02; B21D 53/00
(52) U.S. Cl. ..................... 492/54; 492/53; 29/895.32
(58) Field of Search ............................ 492/54, 56, 49; 29/895.32, 895.3, 895; 427/454, 455, 456

(56) References Cited

U.S. PATENT DOCUMENTS

| | | | | |
|---|---|---|---|---|
| 4,793,041 A | * | 12/1988 | Jenkins et al. | 492/37 |
| 4,991,501 A | * | 2/1991 | Yokoyama et al. | 29/895.32 |
| 5,061,533 A | * | 10/1991 | Gomi et al. | 428/36.3 |
| 5,111,567 A | | 5/1992 | Leino et al. | |
| 5,123,152 A | | 6/1992 | Tenkula et al. | |
| 5,161,306 A | * | 11/1992 | Nakahira et al. | 29/895.32 |
| 5,967,959 A | | 10/1999 | Niemi et al. | |

FOREIGN PATENT DOCUMENTS

| | | | |
|---|---|---|---|
| EP | 0 425 464 A1 | | 2/1991 |
| EP | 0 481 321 A1 | | 4/1992 |
| EP | 0 870 868 A2 | | 10/1998 |
| EP | 0 870 867 A3 | | 11/1998 |
| FI | 82094 | * | 8/1990 |
| FI | 86566 | * | 4/1991 |
| FI | 84506 | * | 8/1991 |
| FI | 90098 | | 9/1993 |
| FI | 971541 | * | 10/1998 |
| JP | 363036284 A | * | 2/1988 |
| JP | 402299890 A | * | 12/1990 |
| JP | 403164296 A | * | 7/1991 |
| JP | 404105940 A | * | 4/1992 |
| JP | 406143857 A | * | 5/1994 |
| JP | 410298891 A | * | 11/1998 |
| JP | 11-173328 | | 6/1999 |
| WO | WO 91/13204 | | 5/1991 |
| WO | WO 97/15719 | | 5/1997 |
| WO | WO 00/49301 | | 8/2000 |

OTHER PUBLICATIONS

PCT International Preliminary Examination Report for PCT/FI00/00109.

* cited by examiner

Primary Examiner—Gregory Vidovich
Assistant Examiner—Marc Jimenez

(57) ABSTRACT

A press roll such as the center roll of a press or the back-up roll of an extended-nip press roll, used in a pulp, paper, board or finishing machine, has a coating with an intermediate sealed layer. The corrosion resistance and impermeability of the roll coating, particularly of such a coating that is made by thermal spraying, can be improved by way of sealing. The coating comprises a porous outermost surface layer made out of a ceramic or ceramic-metal material applied by thermal spraying and at least one sealed layer situated between the outermost surface layer and the roll mantle.

22 Claims, 1 Drawing Sheet

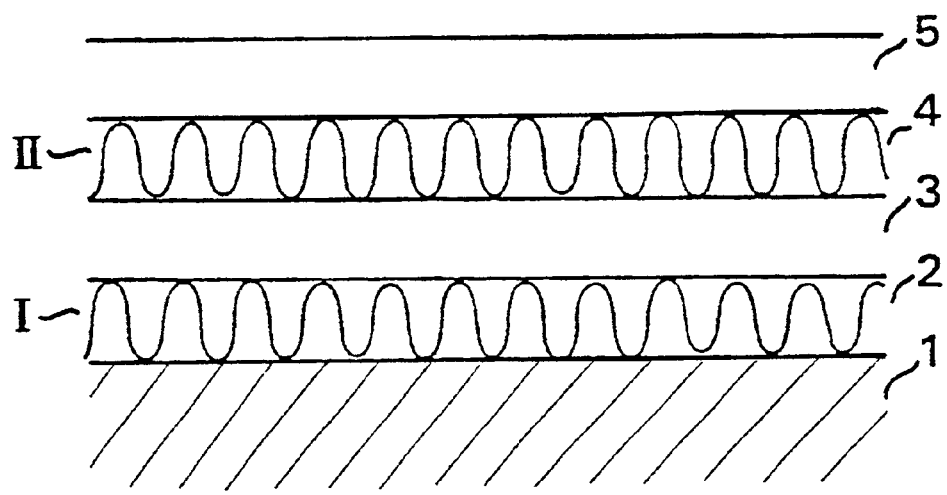

METHOD FOR SEALING OF A COATING ON A ROLL

CROSS REFERENCES TO RELATED APPLICATIONS

This application is a continuation of International Application No. PCT/FI00/00109, filed Feb. 15, 2000, and claims priority on Finnish Application No. 990298, filed Feb. 15, 1999, the disclosures of both of which applications are incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The invention relates to a method for sealing the coating of a roll and particularly an intermediate layer thereof, particularly of a press roll such as the center roll of a press or the back-up roll of an extended-nip press roll, or of a calender roll used in a pulp, paper, board or finishing machine, and, further, to a roll and a coating for a roll. The coating of a roll, particularly a thermally sprayed coating, can be improved in terms of its corrosion resistance and impermeability by virtue of applying a sealing to the coating.

In paper and board machines, rolls with ceramic and cermet coatings have by and large replaced granite rolls used earlier in the art. With rolls with ceramic or cermet coatings, corrosion of various degrees occurs, in particular in more severe conditions, causing corroding of the roll, delamination of the coating and wear of the roll so that it gradually becomes unusable. A coating made on a roll by way of thermal spraying always remains somewhat porous, thus allowing gradual penetration of moisture through the porous surface toward the inner metallic layers thus causing corrosion and so the protection offered by the coating against corrosion is insufficient. Process conditions in the paper and board industry have continually become more and more severe and demanding on the equipment, among other reasons, due to the trend toward enhanced circulation of process water for environmental protection and change of the process environment in a more corrosive direction.

There have been attempts to improve the corrosion resistance of rolls, e.g., by applying metal or cermet layers between the ceramic or cermet coating and the roll mantle. Such methods are described in FI Patent Nos. 86,566, 82,094 and 84,506. From FI Patent Application No. 971,541 is known the application of an impervious intermediary layer under the porous ceramic outer layer, whereby imperviousness of the intermediate layer is attained by way of high-speed flame spraying.

Attempts have also been made to seal the outer surface of a ceramic coating. In WO publication No. 97/15719, a technique is disclosed for sealing a ceramic coating by means of an inorganic solution. Therein, a separate adherence-improving layer is made underneath the ceramic coating layer, and the ceramic coating layer itself is formed by a single porous layer, reduction in the porosity of which has been sought by way of applying an inorganic solution on the roll surface after the coating step. In EP Patent Application No. 0,481,321, a roll for a paper machine is described having a synthetic resin or wax applied onto the ceramic coating in order to seal its pores. Conventional epoxy resins are mentioned as an example of suitable synthetic resins. In FI Patent No. 90,098, a method for coating a roll is described, in which noncontiguous areas of polymer are applied to the roll surface, whereby the ceramic coating of the roll outer surface is impregnated only by a partial length of the roll. Accordingly, all cited publications aim at sealing the pores of the outer surface of the ceramic coating by means of a sealing agent thus preventing corrosive substances from penetrating under the coating.

The latter type of sealing systems performed according to the prior art are problematic in that the material used as the sealing agent changes the properties of the roll surface and, on the other hand, the sealing agent is rapidly lost from the surface thus again changing the surface properties. This makes the control of the runnability of the paper machine more difficult and increases the risk of web breaks. Obviously, there is an imminent need for an impervious roll coating and a method for sealing the surface of a roll so that corrosion can be prevented and, on the other hand, the original desirable properties of the ceramic coating can be kept unchanged.

SUMMARY OF THE INVENTION

The object of the present invention is to provide an impervious coating for a roll used in a paper or board machine and a method for sealing the coating of a roll and, further, a roll having an impervious surface.

The shortcomings of conventional methods known in the art for sealing surface coatings in paper or board machines can be avoided or decisively reduced by virtue of the method described in the following. The invention is based on intermediate sealing of a thermally sprayed coating such as a ceramic coating, whereby the sealing step is carried out prior to the application of the outermost surface layer. Sealing of the coating is performed so that, during the surfacing of a roll, the application of the coating is stopped when a given thickness of coating has been reached and subsequently the sealing treatment is carried out, or alternatively the coating application may be continued and a plurality of such sealing treatments can be carried out. After the last sealing treatment, the coating process is continued up to the final coating thickness. Herein, the sealing agent remains entrapped under the final ceramic coating layer proper, which acts as the functional coating, and thus prevents substances corrosive to the roll frame from reaching the metallic inner part of the roll. The sealing of the intermediate layers may also be performed on a metallic adhesion or corrosion protection layer applied to the outer surface of the metallic roll or, alternatively, to a selected area thereof, and/or said adhesion or corrosion protection layer is next covered with a ceramic layer of a given thickness that is sealed to form an intermediate layer in the above-described manner, whereupon the ceramic coating can be prepared by spraying to its final thickness. After each intermediate layer sealing step, the surface is subjected to an adhesion-improving complementary treatment prior to the spraying of the next coating layer.

BRIEF DESCRIPTION OF THE DRAWINGS

In the following, the invention is elucidated with the help of appended FIG. 1 which shows an embodiment of an impervious roll coating according to the invention, wherein the illustrated details are not limiting to the invention.

DESCRIPTION OF THE PREFERRED EMBODIMENTS

FIG. 1 shows a coating consisting of several layers. On the outer surface of a roll mantle 1, an adhesion/corrosion protection layer 2 has been applied out of a metal or metal alloy. The layer 2 has been sealed by means of a sealing agent. The sealed layer is designated by reference symbol I. Subsequent to this first intermediate layer sealing, at least one ceramic layer 3 and 4 has been applied on the layer I. In the FIGURE, the layer 4 is sealed (second sealed intermediate layer) and the sealed layer is designated by reference symbol II. On the layer II has been applied by spraying a ceramic layer 5 up to the desired final thickness. It should be noted that the number of sealed layers may be varied in the coating system, whereby sealed layers may be interleaved with unsealed layers, but advantageously all the layers are made sealed. It is essential that the outermost layer 5 is free from sealing agent.

The ceramic layers 3–5 may comprise either similar or different ceramic material and, respectively, the sealed intermediate layers I and II may comprise either similar or different sealing agent. The thicknesses of the individual layers may be varied within comparatively large limits, a typical layer thickness being in the range of 50–500 $\mu$m.

Particularly suitable for use as an intermediate layer sealing agent are water-soluble compounds such as water-soluble polymer resins, of which preferred ones are acrylate esters, water-based epoxy resin systems and UV-curable acrylate esters and urethane acrylates as well as inorganic sealing agents, advantageously aluminium orthophosphate, or mixtures of the above-mentioned compounds. Also other synthetic organic polymer resins such as epoxy resins, phenolic resins, polyurethane resins and silicone resins, as well as fluorine-containing resins that are curable by conventional techniques may be used as sealing agents. Advantageous in use as a sealing agent are particularly water-soluble acrylate esters and UV-curable acrylate esters. Essential to the spirit of the invention is that the sealing agents used are featured by a low viscosity, low surface tension, a suitable hardening mechanism for the intended application, small curing shrinkage and sufficiently good corrosion protection capability.

The sealing agent is applied at a desired step of the coating process to the surface by spreading, spraying or some other conventional means suitable for impregnating the surface layer. The sealing agent penetrates the coating layer pores up to a depth determined by the pore structure of the layer (which is affected by spraying velocity and material composition plus particle size) and the technique of sealing agent application. The layer to be sealed can be impregnated with the sealing agent down to the entire radial depth of the layer or by a partial depth of the layer. Excess sealing agent remaining on the layer surface can be removed. e.g., by wiping prior to launching the next process step. The sealing agent is cured if so required before the onset of the next step.

To ensure sufficient adhesion after the sealing step, the treated surface is first subjected to a suitable further treatment and the sealed layer is cleaned free from organic and mechanical impurities before the coating process is continued. Advantageous further treatment techniques are flame treatment, mild shot blasting, solvent treatment, washing, abrasive grinding, carbon dioxide blasting, steaming and combinations thereof carried out prior to the spraying of the next or final coating layer. As a result of such a treatment, the metal or ceramic phase of the sealed surface can be sufficiently purged/activated for adhering the next sprayed coating layer.

The most important benefits of the intermediate layer sealing method according to the invention and of the coating with the sealed intermediate layers, as well as of the roll made using the method according to the invention are a good impermeability and corrosion resistance of the coating. The sealing of the intermediate layers does not detrimentally affect the grinding of the coating or plug a grinding wheel as frequently occurs with rolls having their ceramic surface sealed with resins or waxes. Rolls having a surface coating made with sealed intermediate layers do not impair the runnability of a paper machine in regard to, e.g., detaching of the web, whereby the controlled porosity of the ceramic surface layer of the roll coating is an essentially contributing factor. Sealing the roll surface by its intermediate layer or layers leaves the roll outer surface intact, whereby sealing does not alter its properties as is the case with sealing the roll surface by waxes or resins.

We claim:

1. A roll in a pulp, paper, board or finishing machine, of the type having a roll mantle and an outermost porous surface layer made by thermal spraying out of a ceramic or cermet material, the improvement comprising a coating comprising at least one sealed layer positioned between the outermost surface layer and the roll mantle, wherein the at least one sealed layer is a thermally sprayed ceramic or metallic or ceramic-metal material layer having its pores sealed with an organic or inorganic scaling agent or a mixture thereof.

2. The roll of claim 1, wherein the sealed layer is situated immediately under the porous outermost surface layer.

3. Coating according to any one of claim 1, wherein the sealed layer is the first layer deposited on the surface of the roll mantle.

4. The roll of claim 1, wherein there are a plurality of sealed layers in a superimposed succession alternating with unsealed layers.

5. The roll of claim 1, wherein each layer of the coating with the exception of the outermost surface layer is sealed.

6. The roll of claim 1, wherein there are several sealed layers and different sealing agents have been used in them.

7. The roll of claim 1, wherein the sealing agent is limited to a water-soluble synthetic polymer selected from the group consisting of an acrylate ester, and a water-based epoxy resin system.

8. The roll of claim 1 wherein the sealing agent is limited to a UV-curable synthetic resin.

9. The roll of claim 8 wherein the UV-curable synthetic resin is selected from the group consisting of an acrylate ester and urethane acrylate.

10. The roll of claim 1, wherein the inorganic sealing agent is an aluminium-containing compound.

11. The roll of claim 10 wherein the aluminium-containing compound is aluminium orthophosphate.

12. A method for forming a coated roll for use in a pulp, paper, board, or finishing machine, comprising the steps of:
   applying a porous layer to a roll mantle;
   sealing said porous layer with a sealing agent comprised of an organic agent, an inorganic agent, or a mixture thereof; and
   depositing by thermal spraying on the sealed porous layer an outer surface layer of porous ceramic or porous cermet material which forms the outermost surface layer of the coated roll, the pores of which are not sealed.

13. The method of claim 12 wherein the steps of applying the porous layer and sealing said porous layer comprise the steps of:
   applying a first porous layer to the roll mantel; and
   sealing said first porous layer with the sealing agent, and repeating the steps of applying a porous layer and sealing the applied layer with the sealing agent until a desired thickness is attained.

14. The method of claim 12 wherein after the sealing step, the sealed surface is subjected to an adhesion-improving treatment.

15. The method of claim 14 wherein the adhesion-improving treatment is selected from the group consisting of a flame treatment, shot blasting, solvent treatment, washing, abrasive grinding, carbon dioxide blasting, steaming and any combinations thereof.

16. The method of claim 12, wherein the sealed porous layer is a material selected from the group consisting of a ceramic material, a metallic material, and a ceramic-metal material.

17. The method of claim 12, wherein the sealing agent is limited to an organic polymer which is cured prior to starting the next process step.

18. A ceramic-coated roll of a paper/board or finishing machine having a coating sealed by an organic or inorganic sealing agent, wherein the coating has at least one sealed layer, the pores of which have been sealed with an organic or inorganic sealing agent or a mixture thereof, said sealed layer being situated radially interleaved in the coating between an outermost porous ceramic surface layer and a mantle of the roll.

19. The roll of claim 18, wherein the roll is a press roll.

20. The roll of claim 19 wherein the roll is a center press roll.

21. The roll of claim 18 wherein the roll is a back-up roll of an extended-nip press.

22. The roll of claim 18 wherein the roll is a calender roll.

* * * * *